United States Patent [19]

Solymar

[11] Patent Number: 5,166,527
[45] Date of Patent: Nov. 24, 1992

[54] ULTRAVIOLET LAMP FOR USE IN WATER PURIFIERS

[75] Inventor: George Solymar, Montrose, Calif.
[73] Assignee: Puroflow Incorporated, Santa Monica, Calif.
[21] Appl. No.: 804,044
[22] Filed: Dec. 9, 1991
[51] Int. Cl.⁵ .............................................. H01J 5/50
[52] U.S. Cl. ............................. 250/436; 250/504 R; 313/493; 313/318; 313/634
[58] Field of Search .............. 250/436, 504 R, 492.1; 313/493, 318, 634

[56] References Cited

U.S. PATENT DOCUMENTS 2,298,581 10/1942 Abadie .
3,188,512 6/1965 Moore .
4,074,164 2/1978 Leyendecker .
4,194,125 3/1980 Wolff .
4,683,379 7/1987 Wolff .
4,700,101 10/1987 Ellner et al. ..................... 250/436

FOREIGN PATENT DOCUMENTS 2100503A 12/1982 United Kingdom ............... 313/318

Primary Examiner—Jack I. Berman
Attorney, Agent, or Firm—Rosenman & Colin

[57] ABSTRACT

An ultraviolet lamp for use in a water purifier has two pairs of terminal pins mounted on, and extending outwardly along a longitudinal axis of, one of the end caps of an arc tube. The pairs of pins are offset relative to each other along the longitudinal axis to resist electrical arcing between the pairs of pins exteriorly of the arc tube. An internal barrier wall resists electrical arcing within the one end cap.

22 Claims, 2 Drawing Sheets

ULTRAVIOLET LAMP FOR USE IN WATER PURIFIERS

BACKGROUND OF THE INVENTION

1. Field of the Invention

This invention generally relates to improvements in lamps, especially ultraviolet lamps used in water purifiers.

2. Description of Related Art

Ultraviolet water purifiers are known for disinfecting contaminated water for domestic or commercial use. Such purifiers include at least one lamp for emitting ultraviolet radiation into a chamber filled with contaminated water to kill microorganisms therein. In conventional manner, the lamp includes two electrodes spaced apart within an elongated arc tube containing a gas, particularly mercury vapor with or without additives. A pair of end caps are mounted at the ends of the tube. Each electrode is electrically connected to a respective pair of contacts or terminal pins. The lamp is typically inserted endwise into the water purifier. To simplify insertion, both pairs of pins are conveniently mounted on one of the end caps. When the electrodes are energized by voltage from an electrical power supply, an electrical discharge is initiated in the gas between the electrodes. This discharge reacts with a layer of a radiation-emitting material coated on an interior surface of the arc tube and causes ultraviolet radiation to be emitted from the lamp in a manner well known in the art.

Although generally satisfactory for its intended purpose, the known ultraviolet lamp construction used in water purifiers is disadvantageous when high voltages are applied across the electrodes. In the humid, moisture-laden environment of a water purifier, electrical arcing between the pairs of terminal pins sometimes occurs at supply voltages as low as 40 volts. Such arcing short-circuits the electrodes and reduces the working lifetime of the lamp, thereby leading to frequent lamp replacement.

SUMMARY OF THE INVENTION

1. Objects of the Invention

It is a general object of this invention to advance the state of the art of ultraviolet lamp constructions used in water purifiers.

It is another object of this invention to resist electrical arcing between the pairs of terminal pins.

Another object of this invention is to resist foreshortening the working lifetime of such lamps.

A further object of this invention is to increase the reliability of such lamps in water purifiers.

2. Features of the Invention

In keeping with these objects, and others which will become apparenthereinafter, one feature of this invention resides, briefly stated, in a lamp, especially an ultraviolet lamp for use in a water purifier, comprising an elongated, hollow arc tube extending along a longitudinal axis between opposite end regions. The tube contains a gas, preferably mercury vapor with or without additives.

A pair of electrodes is spaced apart along the longitudinal axis. The electrodes are respectively mounted within the arc tube at the end regions thereof. A pair of end caps is respectively mounted at the end regions of the arc tube.

A first pair of electrical contacts or terminal pins extends in mutual parallelism along the longitudinal axis and is electrically connected to one of the electrodes. A second pair of electrical contacts or terminal pins extends in mutual parallelism along the longitudinal axis and is electrically connected to the other of the electrodes. Both pairs of pins are mounted on, and extend outwardly along the longitudinal axis of, one of the end caps. A wire conductor is located exteriorly of the tube and is electrically connected to one pair of pins at one end region of the tube, as well as to the electrode at the other end region of the tube.

In accordance with this invention, the pairs of pins are offset relative to each other along the longitudinal axis. This offset resists the formation of an electrical arc between the pairs of pins exteriorly of the arc tube, especially in the presence of the moisture-laden, humid environment of the water purifier.

In the preferred embodiment, the one end cap has a stepped outer end wall having a pair of wall portions lying in mutual parallelism in planes generally perpendicular to the longitudinal axis. The first pair of pins is supported on, and extends through, one of the end wall portions for a predetermined distance, and the second pair of pins is supported on, and extends through, the other of the end wall portions for the same predetermined distance. The planes of the end wall portions are spaced apart by a predetermined spacing larger than said predetermined distance in order to still further prevent electrical arcing between the pairs of pins exteriorly of the arc tube.

In further accordance with this invention, a barrier wall internally of the one end cap physically separates the electrical connections to the two pairs of pins to resist the formation of an electrical arc between the pairs of pins interiorly of the one end cap. The barrier wall is advantageously made of the same non-conductive material as the one end cap.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
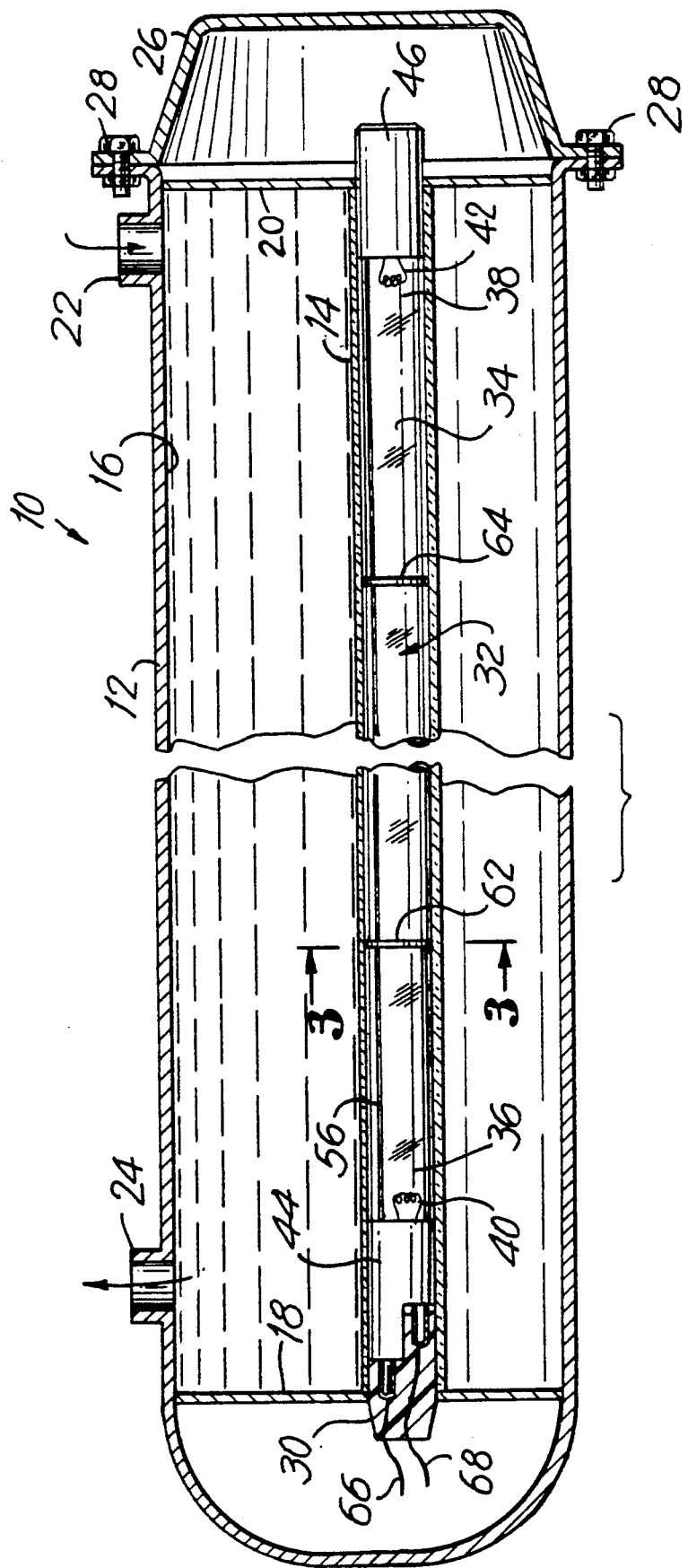
FIG. 1 is a part broken-away, part sectional and part elevational view taken along the longitudinal axis of a water purifier employing the ultraviolet lamp in accordance with this invention.

Referring now to FIG. 1 of the drawings, reference numeral 10 generally identifies a water purifier having a cylindrical housing 12 extending along a longitudinal axis. A hollow, axially-extending sleeve 14 is centrally mounted within the housing 12 between apertured support walls 18, 20 spaced apart along the longitudinal axis. The support walls 18, 20, together with the interior wall of the housing 12 and the exterior wall of the sleeve 14, bound an interior space 16. A water inlet 22 admits pressurized water to be purified into the space 16. A water outlet 24 discharges the purified water from the space 16. The space 16 serves as a flow-through passage for the water contained therein which, during the course of its flow, is exposed to ultraviolet radiation as described below.

A removable cover 26 overlies the support wall 18 at one end of the housing 12. The cover 26 is detachably coupled to the housing 12 by a set of threaded fasteners 28 to permit access to the interior of the sleeve 14 through the aperture of the support wall 18. An electrical socket 30 is removably mounted within the aperture of the support wall 18. An ultraviolet lamp 32 in accordance with this invention is slidably inserted into the interior of the sleeve 14 through the aperture of the support wall 18. An electrical connection, as described below, is made with the socket 30. In operation, the lamp 32 emits ultraviolet radiation of sufficient intensity to kill microorganisms in the water contained in the space 16 to purify the water for domestic and commercial applications.

The lamp 32 includes an elongated, hollow, sealed, arc tube 34 (see, also, FIGS. 2 and 3) constituted of a light-transmissive material, e.g. silica quartz. The tube 34 has opposite end regions 36,38 spaced apart along the longitudinal axis. A gas, preferably mercury vapor with or without additives, is sealingly contained within the tube.

A pair of electrodes 40,42 is respectively mounted within the tube at the end regions 36,38. A pair of end caps 44,46 constituted of a non-conducting material, e.g. ceramic, is respectively mounted at the end regions 36,38 over the sealed end regions of the tube. Each end cap has a bore having a closed base 72 (see, for example, FIG. 2) against which a sealed end region of the tube abuts when the sealed end region is inserted fully into a respective end cap. End cap 44 also has an internal barrier wall 74 extending to the base 72 and subdividing the interior of the end cap into separate compartments 76,78.

Figure 2:
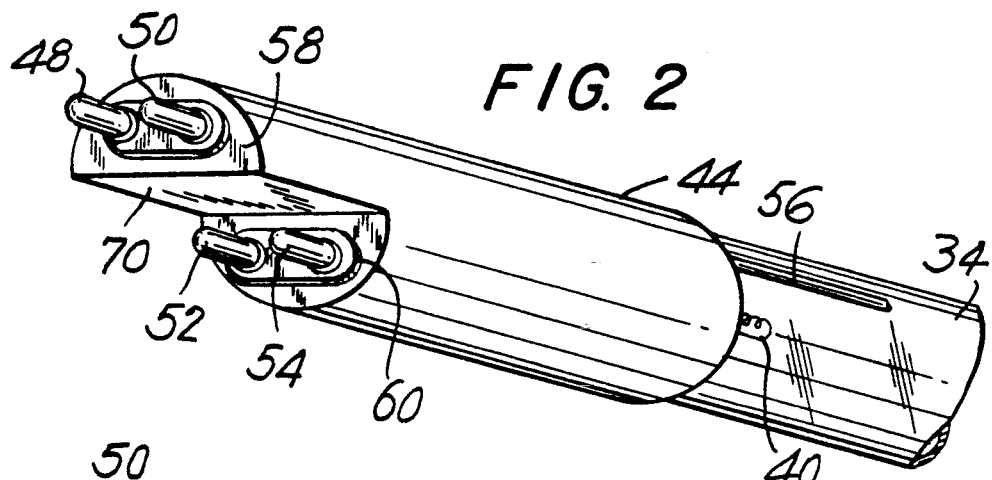
FIG. 2 is a broken-away, perspective view of one end of the lamp of FIG. 1.
Figure 3:
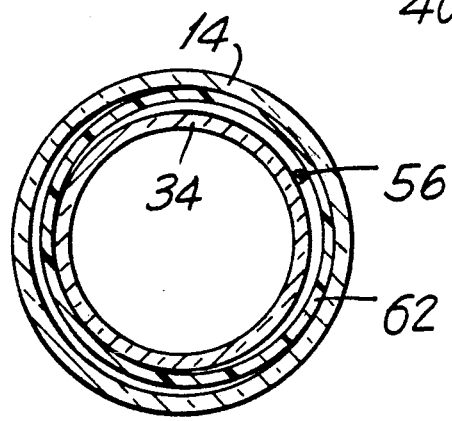
FIG. 3 is an enlarged, sectional view taken on line 3—3 of FIG. 1.

As best shown in FIG. 2, a first pair of electrical contacts or terminal pins 48,50 extends in mutual parallelism along the longitudinal axis, and is mounted on, and extends outwardly of, the end cap 44. A second pair of electrical contacts or terminal pins 52,54 also extends in mutual parallelism along the longitudinal axis, and is also mounted on, and extends outwardly of, the same end cap 44. The pins 48,50 extend into compartment 76, and the pins 52,54 extend into compartment 78.

The pins 48,50 are electrically connected within end cap 44 to one end of a wire conductor 56. The conductor 56 is located exteriorly of the tube 34, and extends along the longitudinal axis to the opposite end cap 46 wherein the other end of the conductor 56 is connected to the electrode 42. The pins 52,54 are electrically connected within the end cap 44 to the electrode 40. The barrier wall 74 physically separates the pairs of pins.

The end cap 44 has a stepped, outer end wall having a pair of end wall portions 58,60 lying in mutual parallelism in planes generally perpendicular to the longitudinal axis. The socket 30 has a complementary stepped, outer end wall. The pins 48,50,52,54 extend past their respective end wall portions 58,60 for the same predetermined distance which is less than the longitudinal spacing between the planes of the end wall portions 58,60. In a preferred embodiment, the longitudinal spacing between the end wall portions 58,60 is on the order of $\frac{1}{2}''$; and the length of each pin past its respective end wall portion is about 0.3".

A set of centering rings 62,64, preferably constituted of a synthetic plastic material, is located on tube 34, being placed thereon before the end caps are attached to the end regions of the tube 34. The rings 62,64 coaxially surround the tube 34 and frictionally engage and support the tube, and assist in centering the tube within sleeve 14.

In operation, the cover 26 is removed, and a lamp 32 is inserted into the interior of the sleeve 14 via the aperture in the support wall 18. After insertion, the socket 30 is connected to the pins 48,50,52,54. Then the cover 26 is installed on the housing 12. Electrical wires 66,68 extend exteriorly of the socket to a non-illustrated electrical power supply. A voltage difference across the wires 66,68 is applied to both electrodes 40,42 causing an electrical discharge within the tube. This discharge causes ultraviolet radiation to be emitted. This radiation passes through the light-transmissive wall of the sleeve 14 to irradiate the water contained in the space 16.

In known prior art constructions, arcing sometimes occurred between the pairs of terminal pins located on the end cap 44 when supply voltages greater than 40 volts were applied. The arcing occurred exteriorly of the end cap 44 between the exterior portions of the pins, and/or interiorly of the end cap 44 between the interior portions of the pins. The humid, moistureladen environment of the water purifier acted as an electrolyte to promote such undesirable arcing even at such low voltages. The above-described longitudinal offset between the first pair of pins 48,50 and the second pair of pins 52,54 resists exterior arcing. In addition, the shorter extension of the pins compared to the relatively longer spacing between the pairs of pins also resists such exterior arcing. An exterior wall 70, as best shown in FIG. 2, serves as a physical obstruction to such exterior arcing.

Figure 4:
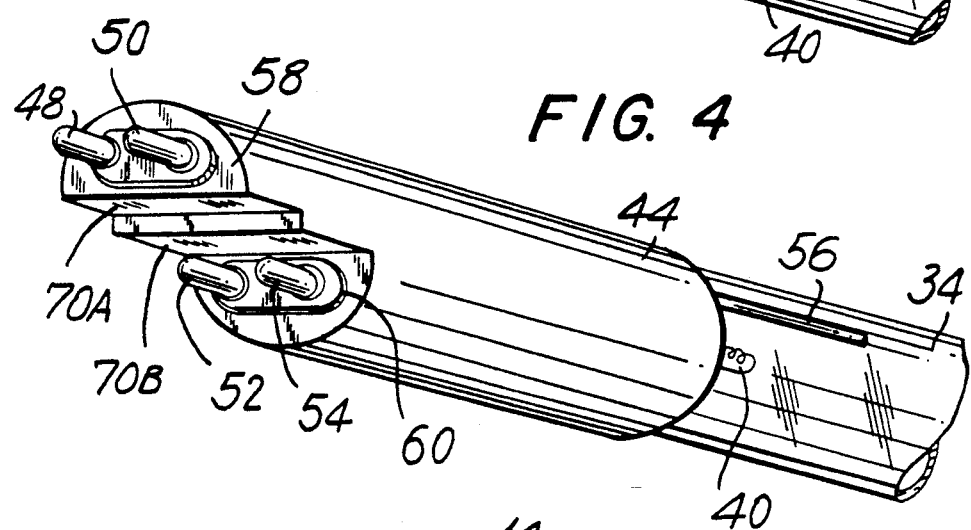
FIG. 4 is a view analogous to FIG. 2 of another embodiment of the lamp.

The exterior wall 70 itself may be stepped, as shown in FIG. 4, to include multiple sections 70A, 70B. Any number of pins and any number of exterior wall sections are comprehended by this invention.

The aforementioned barrier wall 74 prevents arcing interiorly of the end cap 44 by physically separating the electrical connections between the pins 48,50 and the wire conductor, on the one hand, and the electrical connections between the pins 52,54 and the electrode 40, on the other hand. The pairs of pins are thus effectively isolated. The barrier wall itself may be stepped or include multiple sections.

It will be understood that each of the elements described above, or two or more together, also may find a useful application in other types of constructions differing from the types described above.

While the invention has been illustrated and described as embodied in an ultraviolet lamp for use in water purifiers, it is not intended to be limited to the details shown, since various modifications and structural changes may be made without departing in any way from the spirit of the present invention. Thus, the lamp of this invention need not be limited to lamps that emit ultraviolet radiation, nor be limited to use in a water purifier.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A lamp, comprising:
   (a) an elongated, hollow, arc tube extending along a longitudinal axis between opposite end regions and containing a gas;
   (b) a pair of electrodes spaced apart along the longitudinal axis and respectively mounted within the arc tube at the end regions thereof;
   (c) a pair of end caps respectively mounted at the end regions of the arc tube;
   (d) a first pair of electrical pins electrically connected to one of the electrodes;
   (e) a second pair of electrical pins electrically connected to the other of the electrodes; and
   (f) said pins being mounted on one of the end caps, and being offset relative to each other along the longitudinal axis.

2. The lamp according to claim 1, wherein said one end cap has a stepped, outer end wall having a pair of end wall portions lying in mutual parallelism in planes generally perpendicular to the longitudinal axis, and wherein the first pair of pins is supported on, and extends in mutual parallelism outwardly along the longitudinal axis through, one of the end wall portions, and wherein the second pair of pins is supported on, and extends in mutual parallelism outwardly along the longitudinal axis through, the other of the end wall portions.

3. The lamp according to claim 2, wherein the planes of the end wall portions are spaced apart by a predetermined spacing along the longitudinal axis, and wherein the second pair of pins extends for a predetermined distance past said other end wall portion, and wherein said predetermined distance is less than said predetermined spacing.

4. The lamp according to claim 1, wherein the first pair of pins is electrically connected to said one electrode along a conductor that rests exteriorly on, and extends along the longitudinal axis along, the arc tube.

5. The lamp according to claim 1, wherein said one end cap has an interior; and further comprising a barrier wall extending between the pins within the interior of said one end cap.

6. The lamp according to claim 5, wherein said one end cap has a bore into which a respective end region of the arc tube is inserted, said bore having a base against which the respective end region of the arc tube abuts; and wherein said barrier wall extends along the longitudinal axis to the base.

7. The lamp according to claim 1; further comprising a socket having a first pair of openings for the first pair of pins, and a second pair of openings for the second pair of pins; and wherein the openings are offset relative to each other along the longitudinal axis.

8. An ultraviolet lamp for use in a water purifier, comprising:
   (a) an elongated, hollow, arc tube extending along a longitudinal axis between opposite end regions and containing a gas;
   (b) a pair of electrodes spaced apart along the longitudinal axis and respectively mounted within the arc tube at the end regions thereof;
   (c) a pair of end caps respectively mounted at the end regions of the arc tube;
   (d) a first pair of electrical pins electrically connected to one of the electrodes;
   (e) a second pair of electrical pins electrically connected to the other of the electrodes; and
   (f) said pins being mounted on one of the end caps, and being offset relative to each other along the longitudinal axis to resist electrical arcing between said pins during operation of the water purifier.

9. The lamp according to claim 8, wherein said one end cap has a stepped, outer end wall having a pair of end wall portions lying in mutual parallelism in planes generally perpendicular to the longitudinal axis, and wherein the first pair of pins is supported on, and extends in mutual parallelism outwardly along the longitudinal axis through, one of the end wall portions, and wherein the second pair of pins is supported on, and extends in mutual parallelism outwardly along the longitudinal axis through, the other of the end wall portions.

10. The lamp according to claim 9, wherein the planes of the end wall portions are spaced apart by a predetermined spacing along the longitudinal axis, and wherein the second pair of pins extends for a predetermined distance past said other end wall portion, and wherein said predetermined distance is less than said predetermined spacing.

11. The lamp according to claim 8, wherein the first pair of pins is electrically connected to said one electrode along a conductor that rests exteriorly on, and extends along the longitudinal axis along, the arc tube.

12. The lamp according to claim 9, wherein said one end cap has an interior; and further comprising a barrier wall extending between the pins within the interior of said one end cap.

13. The lamp according to claim 12, wherein said one end cap has a bore into which a respective end region of the arc tube is inserted, said bore having a base against which the respective end region of the arc tube abuts; and wherein said barrier wall extends along the longitudinal axis to the base.

14. The lamp according to claim 9; further comprising a socket having a first pair of openings for the first pair of pins, and a second pair of openings for the second pair of pins; and wherein the openings are offset relative to each other along the longitudinal axis.

15. A water purifier arrangement, comprising:
   (a) a hollow housing extending along a longitudinal axis, and having a hollow, axially-extending sleeve mounted therein and bounding a flow-through passage, said housing having an inlet for admitting water to be purified into the passage, and an outlet for discharging purified water from the passage;
   (b) an elongated, hollow, axially-extending arc tube mounted within the sleeve and extending between opposite end regions of the tube, said arc tube containing a gas;
   (c) a pair of electrodes spaced apart along the longitudinal axis and respectively mounted within the arc tube at the end regions thereof;
   (d) a pair of end caps respectively mounted at the end regions of the arc tube;
   (e) a first pair of electrical pins electrically connected to one of the electrodes;
   (f) a second pair of electrical pins electrically connected to the other of the electrodes; and (g) said pins being mounted on one of the end caps, and being offset relative to each other along the longitudinal axis to resist electrical arcing between said pins during operation of the water purifier.

16. The arrangement according to claim 15, wherein said one end cap has a stepped, outer end wall having a pair of end wall portions lying in mutual parallelism in planes generally perpendicular to the longitudinal axis, and wherein the first pair of pins is supported on, and extends in mutual parallelism outwardly along the longitudinal axis through, one of the end wall portions, and wherein the second pair of pins is supported on, and extends in mutual parallelism outwardly along the longitudinal axis through, the other of the end wall portions.

17. The arrangement according to claim 16, wherein the planes of the end wall portions are spaced apart by a predetermined spacing along the longitudinal axis, and wherein the second pair of pins extends for a predetermined distance past said other end wall portion, and wherein said predetermined distance is less than said predetermined spacing.

18. The arrangement according to claim 15, wherein the first pair of pins is electrically connected to said one electrode along a conductor that rests exteriorly on, and extends along the longitudinal axis along, the arc tube.

19. The arrangement according to claim 15, wherein said one end cap has an outer end wall with multiple end wall portions, at least one of the end wall portions being free of pins.

20. The arrangement according to claim 15, wherein said one end cap has an interior; and further comprising a barrier wall extending between the pins within the interior of said one end cap.

21. The arrangement according to claim 20, wherein said one end cap has a bore into which a respective end region of the arc tube is inserted, said bore having a base against which the respective end region of the arc tube abuts; and wherein said barrier wall extends along the longitudinal axis to the base.

22. The arrangement according to claim 15; further comprising a socket having a first pair of openings for the first pair of pins, and a second pair of openings for the second pair of pins; and wherein the openings are offset relative to each other along the longitudinal axis.

* * * * *